United States Patent [19]

Stephens et al.

[11] Patent Number: 5,664,824
[45] Date of Patent: Sep. 9, 1997

[54] FLEXIBLE TARPAULIN SUPPORT DEVICE

[76] Inventors: Donald W. Stephens, 1814 E. 58th St., Tulsa, Okla. 74105; Patricia A. Lemmons, 2834 Redbud, Katy, Tex. 77493

[21] Appl. No.: 696,251

[22] Filed: Aug. 13, 1996

Related U.S. Application Data

[63] Continuation-in-part of Ser. No. 437,839, May 9, 1995, which is a continuation-in-part of Ser. No. 23,121, May 18, 1994, Pat. No. Des. 368,888.

[51] Int. Cl.[6] .................................................. B60P 7/04
[52] U.S. Cl. .................................... 296/100; 296/104
[58] Field of Search ..................................... 296/100, 104

[56] References Cited

U.S. PATENT DOCUMENTS

| | | | |
|---|---|---|---|
| 3,226,153 | 12/1965 | Haid | 296/104 |
| 4,212,492 | 7/1980 | Johnsen | 296/98 |
| 4,248,475 | 2/1981 | Johnsen | 296/100 |
| 4,484,777 | 11/1984 | Michel | 296/98 |
| 4,792,178 | 12/1988 | Kokx | 296/98 |
| 4,854,630 | 8/1989 | Biancale | 296/100 |
| 4,854,633 | 8/1989 | Kraft et al. | 296/104 |
| 4,902,065 | 2/1990 | Thralls | 296/104 |
| 4,915,439 | 4/1990 | Cramaro | 296/98 |
| 4,923,240 | 5/1990 | Swanson | 296/100 |
| 5,080,423 | 1/1992 | Merlot et al. | 296/105 |
| 5,145,230 | 9/1992 | Biancale | 296/100 |
| 5,211,441 | 5/1993 | Barkus et al. | 296/104 |
| 5,301,720 | 4/1994 | Plummer, Jr. et al. | 140/147 |
| 5,301,995 | 4/1994 | Isler | 296/100 |
| 5,310,441 | 5/1994 | Tsutsumi et al. | 156/382 |
| 5,460,423 | 10/1995 | Kersting et al. | 296/100 |

*Primary Examiner*—Gary C. Hoge
*Attorney, Agent, or Firm*—Head, Johnson & Kachigian

[57] ABSTRACT

A tarpaulin support device for an open top of a trailer, vehicle or the like. The device includes a flexible and resilient pole having a first end and a second end, the pole being normally straight and bowed under tension to an arched position. A first bracket is opposed to a second bracket, each bracket being attached to the trailer and each bracket having a non-cylindrical opening therein. A first socket and a second socket each have a receptacle to receive one of the pole ends, each socket terminating in a non-cylindrical post receivable in one of the openings to retain the sockets and retain the pole and to prevent radial movement of the post.

9 Claims, 4 Drawing Sheets

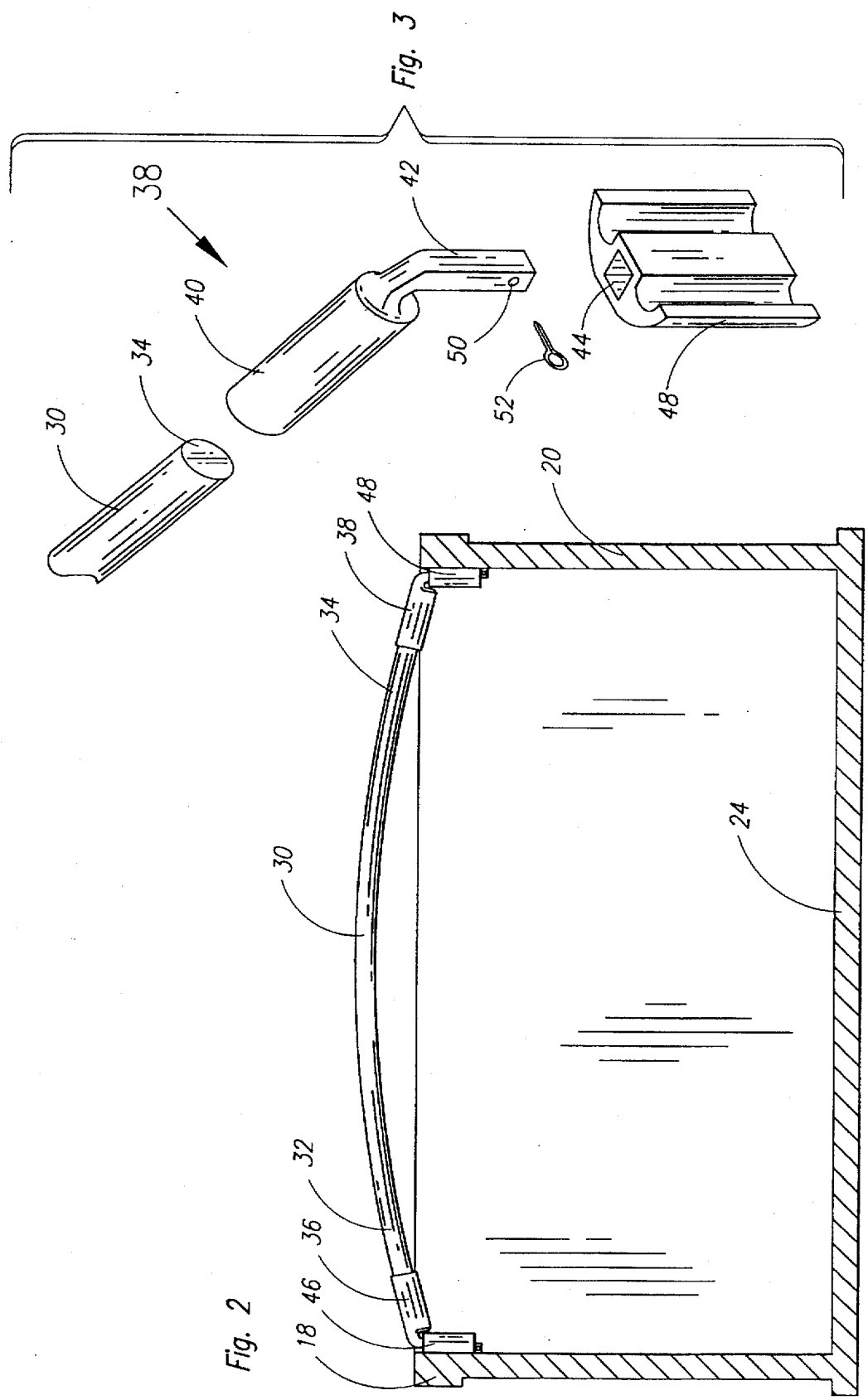

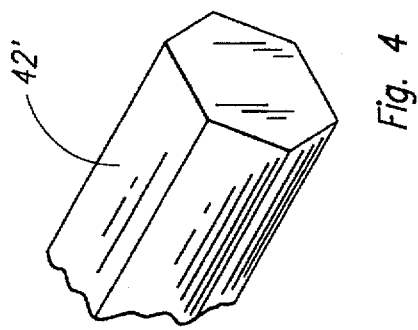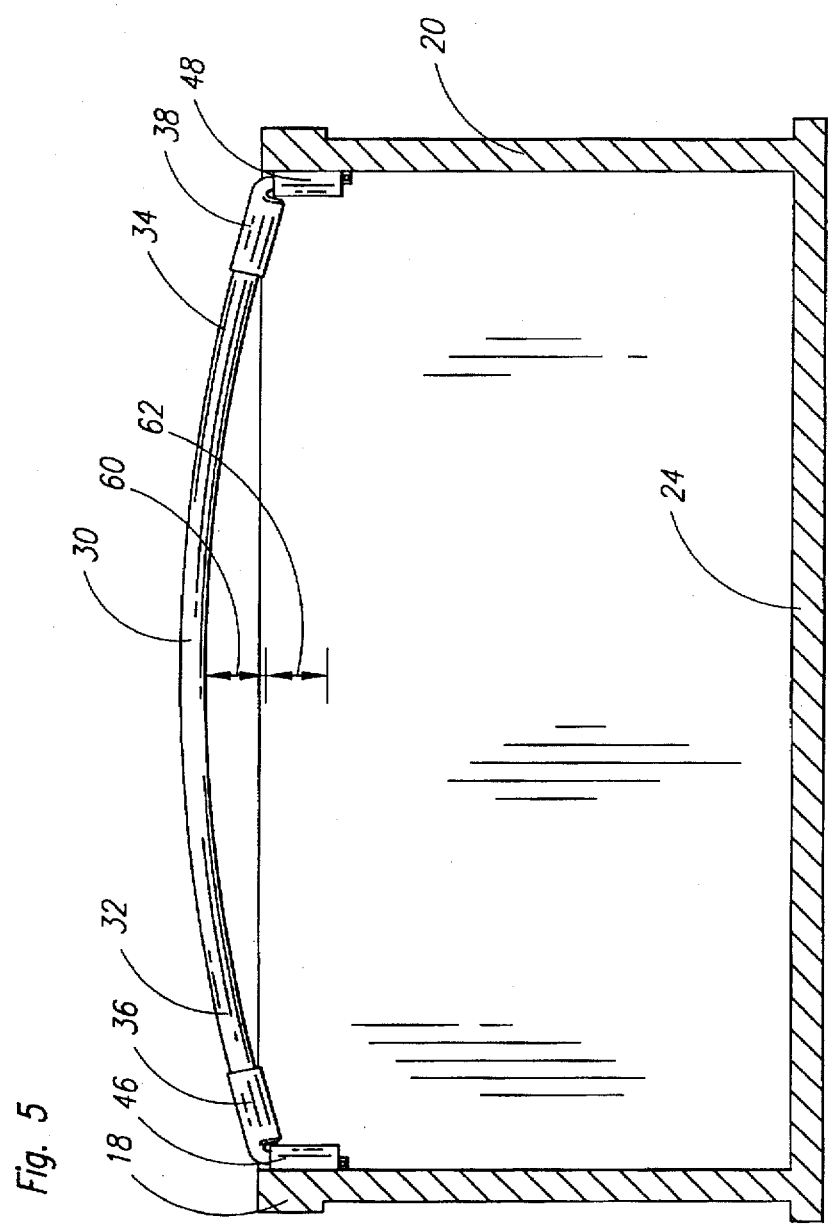

FLEXIBLE TARPAULIN SUPPORT DEVICE

CROSS-REFERENCE OF APPLICATION

This is a continuation-in-part of pending patent application Ser. No. 08/437,839, filed May 9, 1995, entitled FLEXIBLE TARPAULIN SUPPORT DEVICE which is a continuation-in-part of patent application Ser. No. 29/023121, filed May 18, 1994, entitled FLEXIBLE TRUCK TARP SUPPORT, now U.S. Patent No. D368,888.

BACKGROUND OF THE INVENTION

1. Field of the Invention

The present invention is directed to a support device to support a tarpaulin to cover an open top of a trailer or the like. In particular, the present invention is directed to a tarpaulin support device that may quickly and simply be attached to and detached from a vehicle and that is both flexible and resilient to withstand the force from impact during loading.

2. Prior Art

Tractor trailers used to haul loose material, such as sand and gravel, will often employ a tarpaulin cover over the open top of the trailer having a bottom and a pair of opposed side walls. The tarpaulin discourages any of the loose material from falling or being blown off during transportation. A series of curved bows extending laterally across the open top form a support for the tarpaulin.

Use of a tarpaulin which is arched at the center provides a number of advantages. Rainwater will run off of the load more easily. Additionally, the arched center accommodates high loads.

In the case of sand and gravel, loading of these materials is often preceded by removal of the bows in order to avoid damage. Loading of these materials through the open top will often dent, twist and break the support bows.

To address this problem, a number of measures have been taken in the past. In some cases, the support bows are removed during the loading operation to prevent damage. In other instances, the support bows are attached to the trailer through a spring or springs. As an example, Thralls (U.S. Pat. No. 4,902,065) suggests use of a bendable tubular bar.

It is desirable to provide a roof bow tarpaulin support system having a plurality of flexible and resilient poles that are bowed away from the floor of the trailer.

It is desirable to provide a roof bow tarpaulin support system that does not require removal of the poles to perform the loading operation and will minimize damage to the poles.

It is desirable to provide a roof bow tarpaulin support system that will withstand impact from materials being loaded and the loading equipment, and will be both flexible and resilient.

It is desirable to provide a roof bow tarpaulin support system having poles that are normally straight and bowed under tension to an arched position outwardly a selected vertical component.

BRIEF DESCRIPTION OF THE DRAWINGS

FIG. 2 is a sectional view taken along section line 2—2 of FIG. 1;

FIG. 3 is a partial, exploded view of the flexible tarpaulin device constructed in accordance with the present invention.

FIG. 4 is a partial view of a pole in an alternate embodiment of the present invention; and FIGS. 5 and 6 are sectional views as shown in FIG. 2 illustrating the flexible and resilient characteristics of the poles which are a part of the present invention.

SUMMARY OF THE INVENTION

The present invention is directed to a tarpaulin support device to be used on a trailer, truck or the like, having an open top and a pair of opposed sidewalls. The device is used to support a tarpaulin that is often placed over the open top of the trailer after loading.

The support device includes a flexible and resilient pole which extends laterally across the open top. The pole includes a first end and a second end. The pole has a circular cross-section wherein the pole is both flexible and resilient. The pole, when installed, will be bowed outwardly away from the floor of the trailer.

The first pole end is received in a first socket while the second pole end is received in a second socket. Each socket includes a cylindrical receptacle to receive the respective pole end therein. Each socket terminates in an extending post. The posts are non-cylindrical and are received in mating openings within brackets. The opening is only slightly larger than the post so that the post fits snugly in the opening. To insert the posts into the brackets, the posts are moved axially into the bracket openings. Once the posts are within the bracket openings, no radial movement of the posts is permitted.

Each of the first and second brackets are attached to the sidewalls of the trailer so that the brackets are opposed to each other.

Each receptacle is at an obtuse angle to its respective post. Additionally, the length of the pole is longer than the distance between the first socket and the second socket. The pole is, thus, normally straight and under tension when bowed. The pole will be bowed under tension to an arched position outwardly a selected vertical component. The angular receptacle post-arrangement facilitates the bow or arch of the pole.

Under force from loading equipment and material being loaded into the open top, the pole will flex and deflect in an opposite direction in an amount up to the selected vertical component.

DETAILED DESCRIPTION OF THE PREFERRED EMBODIMENTS

Figure 1:
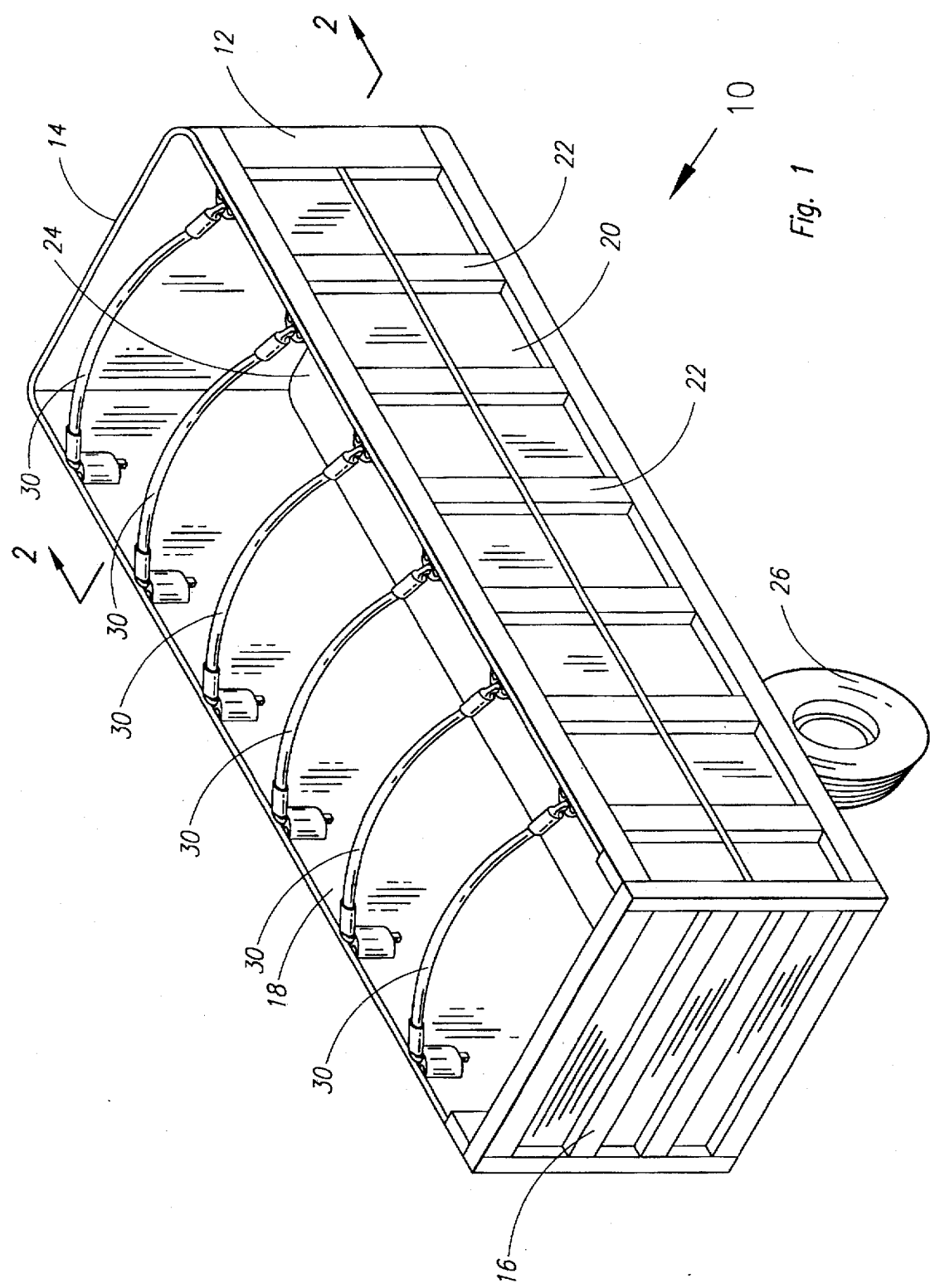
FIG. 1 is a perspective view of a flexible tarpaulin support device installed on an open top of a trailer.

Referring to the drawings in detail, FIG. 1 illustrates a perspective view of a tarpaulin support device 10 constructed in accordance with the present invention. The device is shown in use and installed on a trailer 12 apart from the tractor or other vehicle. In FIG. 1, the trailer 12 is shown empty of its load. The trailer includes a front end wall 14 and an opposed rear end 16 that would be closed during loading and transportation and would be open for unloading. The trailer might include a removable or swinging gate at the rear end. The trailer 12 also includes a pair of opposed side walls 18 and 20.

The trailer walls 18 and 20 may include various types of reinforcements such as shown at 22, all as are well-known in the trailer industry. The trailer walls extend from a floor 24 (partially visible in FIG. 1). A pair of rear wheels 26 (one visible in FIG. 1) support the trailer 12.

After the trailer has been loaded with sand, gravel or other material, a tarpaulin is often placed over the open top of the trailer. The tarpaulin discourages any of the loose material from falling or being blown off during transportation.

With reference to the sectional view in FIG. 2 and continuing reference to FIG. 1, the support device 10 includes a flexible and resilient pole 30 which extends laterally across the open top. The pole 30 includes a first end 32 and a second end 34. The pole 30 has a circular cross section and is composed of a nylon composite which, although sturdy, is both flexible and resilient. The pole 30 in the present embodiment is fabricated from a nylon composite and is normally straight. When installed, the pole 30 is bowed outwardly away from the floor of the trailer 12. By exerting force, the pole may be moved to an arched position outwardly from the floor 24. When the force is released, the pole 30 will return to its straight condition.

The first pole end 32 is received in a first socket 36 while the second pole end 34 is received in a second socket 38. Each socket includes a cylindrical receptacle to receive the respective pole end therein. As an example, FIG. 3 shows an exploded view of the second socket apart from the pole.

The second socket 38 includes a cylindrical receptacle 40 having an open end to receive the second end 34 of the pole 30. The socket 38 terminates in a post 42. The post 42 is non-cylindrical, in the present embodiment being square in cross section.

It will be understood that other non-cylindrical configurations of the post such as a hexagon might be employed with the same results, as seen in the post 42' shown in FIG. 4.

Returning to a consideration of FIGS. 1, 2 and 3, the post 42 is received in a mating opening 44 within a second bracket 48. The opening 44 is only slightly larger than that of the post so that the post fits snugly in the opening. A corresponding, opposed first bracket 46 would receive the post from the first socket 36.

The posts are not permanently affixed in the bracket openings. To insert, the posts are moved axially into the bracket openings.

The post 42 may optionally include an aperture 50. A cotter pin 52 may be inserted into the aperture 50 once it is residing in the bracket 48 to the prevent axial movement of the post.

In the present embodiment, each of the first and second brackets 46 and 48 are attached to the side walls 18 and 20, respectively of the trailer. The brackets are welded or otherwise secured to the side walls so they are facing each other. The brackets 46 and 48 are arranged so that the bracket openings (44 shown in FIG. 3) are parallel to the side walls. In the embodiment shown, the bracket openings are parallel to each other.

Each receptacle is at an obtuse angle to its respective post. As clearly seen in FIG. 3, the receptacle 40 is positioned at an obtuse angle to the post 42. In the present embodiment, the socket is approximately 101° in relation to the post. The angular receptacle and post arrangement facilitates the bow of the pole.

Additionally, the length of the pole is longer than the distance between the first socket 36 and the second socket 38. Accordingly, the pole is under tension when bowed.

It has been found that the tarpaulin support device 10 and, in particular, the pole will flex and deflect if sand, gravel or other materials impact the pole during the loading operation. The pole will also flex and deflect in the event of impact from an end loader or other loading equipment used during the loading operation.

Figure 6:
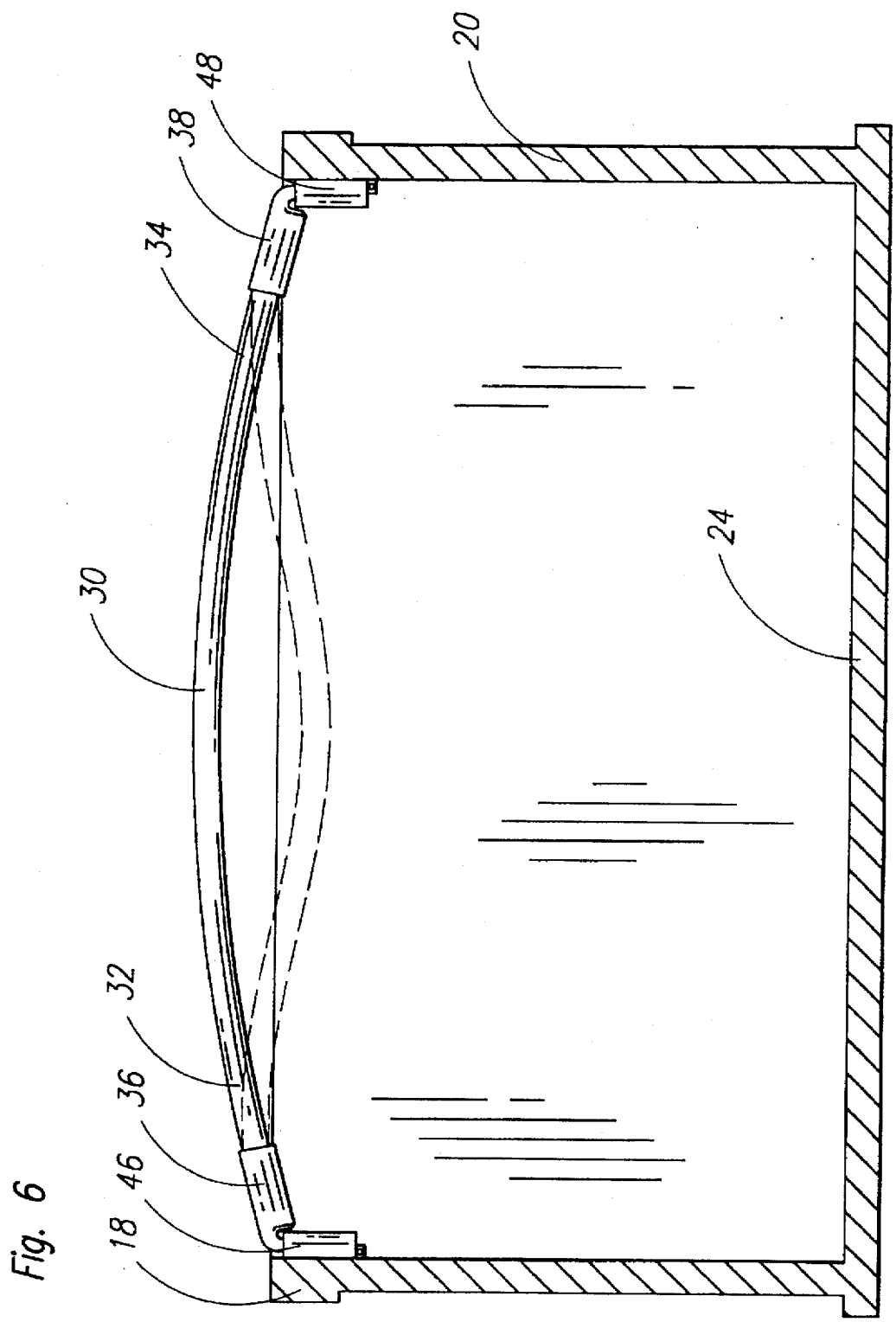

FIGS. 5 and 6 illustrate the flexibility and resiliency of the present invention. The arrow 60 indicates the selected vertical component of the arch which the pole 30 is bowed under tension The amount of the vertical component may be somewhat controlled by selecting the length of the pole.

Under force from loading equipment or from material being loaded in the open top, the pole 30 will flex and deflect in a direction opposite to the arched position. It has been found that the pole will flex and deflect not only the amount of the vertical component shown by arrow 60 but an equal amount in the opposite direction shown by arrow 62.

While the foregoing description is directed to a single tarpaulin support device 10, it will be understood that a plurality of devices will be aligned laterally across the open top of the trailer to support the tarpaulin, all as shown in FIG. 1.

Whereas, the present invention has been described in relation to the drawings attached hereto, it should be understood that other and further modifications, apart from those shown or suggested herein, may be made within the spirit and scope of this invention.

What is claimed is:

1. A tarpaulin support device for an open top of a trailer or vehicle, which device comprises:

a flexible and resilient pole having a first end and a second end, said pole being normally straight and bowed under tension to an arched position outwardly from said trailer or vehicle a selected vertical component wherein said pole will flex and deflect under force from loading equipment and material being loaded into said open top in an opposite direction up to an amount equal to said selected vertical component;

a first bracket and a second, opposed bracket, each said bracket attached to said trailer and having a non-cylindrical opening therein; and a first socket and a second socket, each socket having a receptacle to receive one said pole end, each socket terminating in a non-cylindrical post receivable in one said opening to retain said sockets and said pole and to prevent radial movement of said post, and to retain said pole in said arched position.

2. A tarpaulin support device as set forth in claim 1 wherein each said post has an aperture to receive a cotter pin.

3. A tarpaulin support device as set forth in claim 1 wherein each said receptacle extends at an obtuse angle to said post.

4. A tarpaulin support device as set forth in claim 1 wherein each said bracket non-cylindrical opening has a square cross-section.

5. A tarpaulin support device as set forth in claim 1 wherein each said bracket non-cylindrical opening has a hexagon cross section.

6. A tarpaulin support device as set forth in claim 1 wherein said pole is circular in cross section and composed of a nylon composite.

7. A tarpaulin support device for a trailer or vehicle having a bottom, an open top and a pair of opposed side walls, which device comprises:

a flexible and resilient pole having a first end and a second end, said pole bowed from a normally straight position under tension to an arched position outwardly from said trailer or vehicle a selected vertical component wherein said pole will flex and deflect under force from loading equipment and material being loaded into said open top in an opposite direction up to an amount equal to said selected vertical component;

a first socket for said first end and a second socket for said second end, each socket terminating in a post; and means to secure each said post to one said side wall to allow axial movement of said post while prohibiting radial movement of said post and to retain said pole in said arched position.

8. A tarpaulin support device as set forth in claim 7 wherein said means to secure each said post includes a bracket secured to each said side wall, each said bracket having a non-cylindrical opening and wherein each said post is non-cylindrical and is receivable in said bracket opening.

9. A tarpaulin support device as set forth in claim 7 wherein said first socket is at an obtuse angle to said post and said second socket is at an obtuse angle to said post.

* * * * *